(12) United States Patent
Blake et al.

(10) Patent No.: US 8,645,642 B2
(45) Date of Patent: Feb. 4, 2014

(54) TRACKING DYNAMIC MEMORY REALLOCATION USING A SINGLE STORAGE ADDRESS CONFIGURATION TABLE

(75) Inventors: Michael A. Blake, Wappingers Falls, NY (US); Pak-kin Mak, Poughkeepsie, NY (US); Michael F. Fee, Cold Spring, NY (US); Mark S. Farrell, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 12/821,986

(22) Filed: Jun. 23, 2010

(65) Prior Publication Data

US 2011/0320755 A1 Dec. 29, 2011

(51) Int. Cl.
*G06F 12/00* (2006.01)

(52) U.S. Cl.
USPC ........... 711/154; 711/118; 711/165; 711/170; 711/173

(58) Field of Classification Search
USPC .......................... 711/118, 154, 165, 170, 173
See application file for complete search history.

(56) References Cited

U.S. PATENT DOCUMENTS

| | | | | |
|---|---|---|---|---|
| 5,765,210 A | * | 6/1998 | Greenstein et al. | 711/208 |
| 6,697,916 B2 | * | 2/2004 | Lasserre et al. | 711/118 |
| 6,907,600 B2 | * | 6/2005 | Neiger et al. | 717/139 |
| 7,047,386 B1 | * | 5/2006 | Ngai et al. | 711/170 |
| 7,418,567 B2 | * | 8/2008 | Clisby | 711/170 |
| 8,001,354 B2 | * | 8/2011 | Allison et al. | 711/170 |
| 2005/0071595 A1 | * | 3/2005 | Irish et al. | 711/170 |
| 2008/0177974 A1 | | 7/2008 | Chiang et al. | |
| 2010/0161879 A1 | * | 6/2010 | Nation et al. | 711/103 |

* cited by examiner

*Primary Examiner* — Arpan P. Savla
(74) *Attorney, Agent, or Firm* — Cantor Colburn LLP; John Campbell

(57) ABSTRACT

Tracking dynamic memory de-allocation using a single configuration table having a first register and a second register includes setting the first register as an active register, initiating a de-allocation of desired storage increments from a memory partition, setting the storage increments in the second register as invalid, purging all caches associated with the single configuration table, setting the second register as the active register and the first register as an inactive register, setting the desired storage increments in the first register as invalid, switching the active register from the second register to the first register to complete memory de-allocation using the single configuration table.

18 Claims, 5 Drawing Sheets

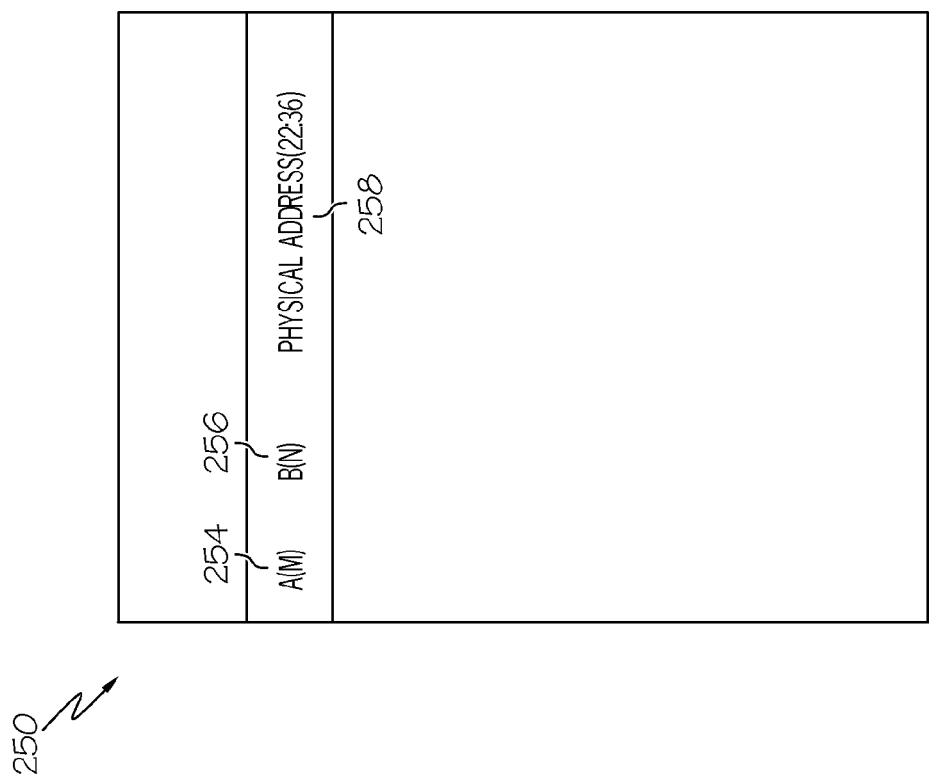

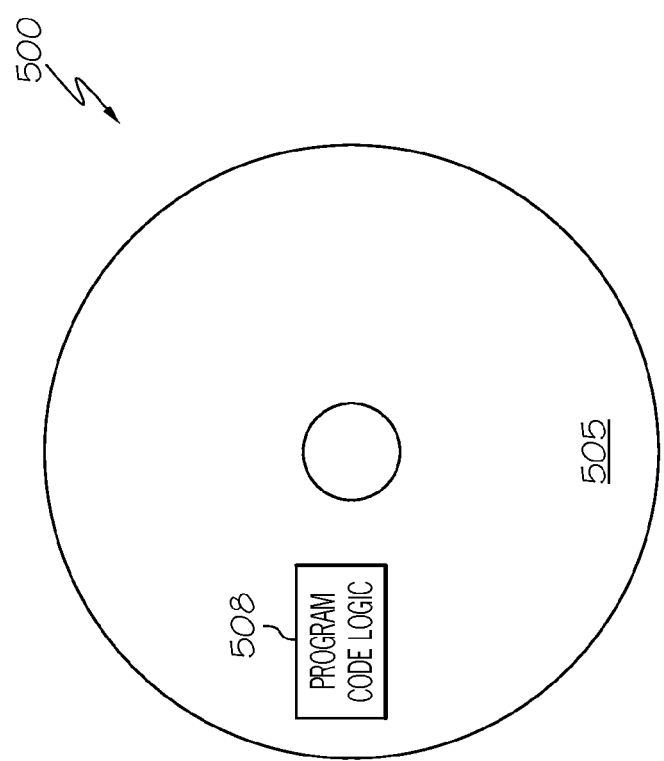

TRACKING DYNAMIC MEMORY REALLOCATION USING A SINGLE STORAGE ADDRESS CONFIGURATION TABLE

BACKGROUND

This invention relates generally to processing within a computing environment, and more particularly to tracking dynamic memory reallocation using a single storage address configuration table.

Currently, many computer storage systems are divided into multiple partitions. Each partition is assigned a certain system address range which is typically greater than an initial allocation of physical storage. When throughput or responsiveness of tasks running on a partition slows to undesirable levels, and the initial storage allocation is less than adequate, a portion of storage assigned to an idle or less performance intensive process is dynamically reassigned to the partition. Reallocation includes first de-allocating desired storage increments from one memory partition, followed by allocating desired storage increments to another memory partition. De-allocation of storage also occurs when an entire partition is about to become deactivated. In either case, it is necessary to maintain and update configuration tables before, during, and after the re-allocation.

Currently, two entire copies of the configuration tables are employed by the system to facilitate dynamic storage reallocation. In use, only one copy of the configuration table is active at any given time. The other copy runs in a background mode and is employed by the system during memory de-allocation. The system marks which system address will be invalid in the copy running in the background. A switch over from the active copy to the copy running in the background mode occurs when entry invalidations in the copy running in the background are complete and the corresponding system addresses are purged from all caches in the system.

BRIEF SUMMARY

An embodiment is a computer implemented method of tracking dynamic memory allocation using a single configuration table having a first register and a second register. The method includes setting the first register as an active register, initiating a de-allocation of desired storage increments from a memory partition, setting the desired storage increments in the second register as invalid, purging all caches associated with the single configuration table, setting the second register as the active register and the first register as an inactive register, setting the desired storage increments in the first register as invalid, switching the active register from the second register to the first register to complete memory de-allocation using the single configuration table.

Another exemplary is a device configured to track dynamic memory allocation in a single configuration table having first and second registers. The device includes memory for storing a program, and a processor functionally coupled to the memory. The processor is configured to be responsive to computer-executable instructions contained in the program and operative for setting the first register an active register, initiating a de-allocation of desired storage increments from a memory partition, setting the desired storage increments in the second register as invalid, purging all caches associated with the single configuration table, setting the second register as the active register and the first register as an inactive register, setting the desired storage increments in the first register as invalid, and switching the active register from the second register to the first register to complete memory de-allocation using the single configuration table.

Another exemplary embodiment is a computer program product for tracking memory allocation in a single configuration table having first and second registers, comprising a tangible storage medium readable by a processing circuit and storing instructions for execution by the processing circuit for performing a method including setting the first register an active register, initiating a de-allocation of desired storage increments from a memory partition, setting the desired storage increments in the second register as invalid, purging all caches associated with the single configuration table, setting the second register as the active register and the first register as an inactive register, setting the desired storage increments in the first register as invalid, and switching the active register from the second register to the first register to complete memory de-allocation using the single configuration table.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES:

FIG. 3 is a block diagram depicting a configuration table in accordance with an exemplary embodiment;

FIG. 6 depicts an exemplary embodiment of an article of manufacture incorporating one or more aspects of the exemplary embodiment.

DETAILED DESCRIPTION

An exemplary embodiment of the present invention provides a method of tracking dynamic storage allocation and de-allocation using a single configuration table. The use of a single configuration table eliminates the need to propagate and track multiple configuration tables. The single configuration table also reduces storage requirements resulting in enhanced storage capacity for non-system specific processes.

Technical effects and benefits include the ability to track dynamic storage allocation and de-allocation tasks in a single table. The use of a single configuration table leads to greater chip area capacity thereby enhancing an overall processing ability of the system.

Figure 1:
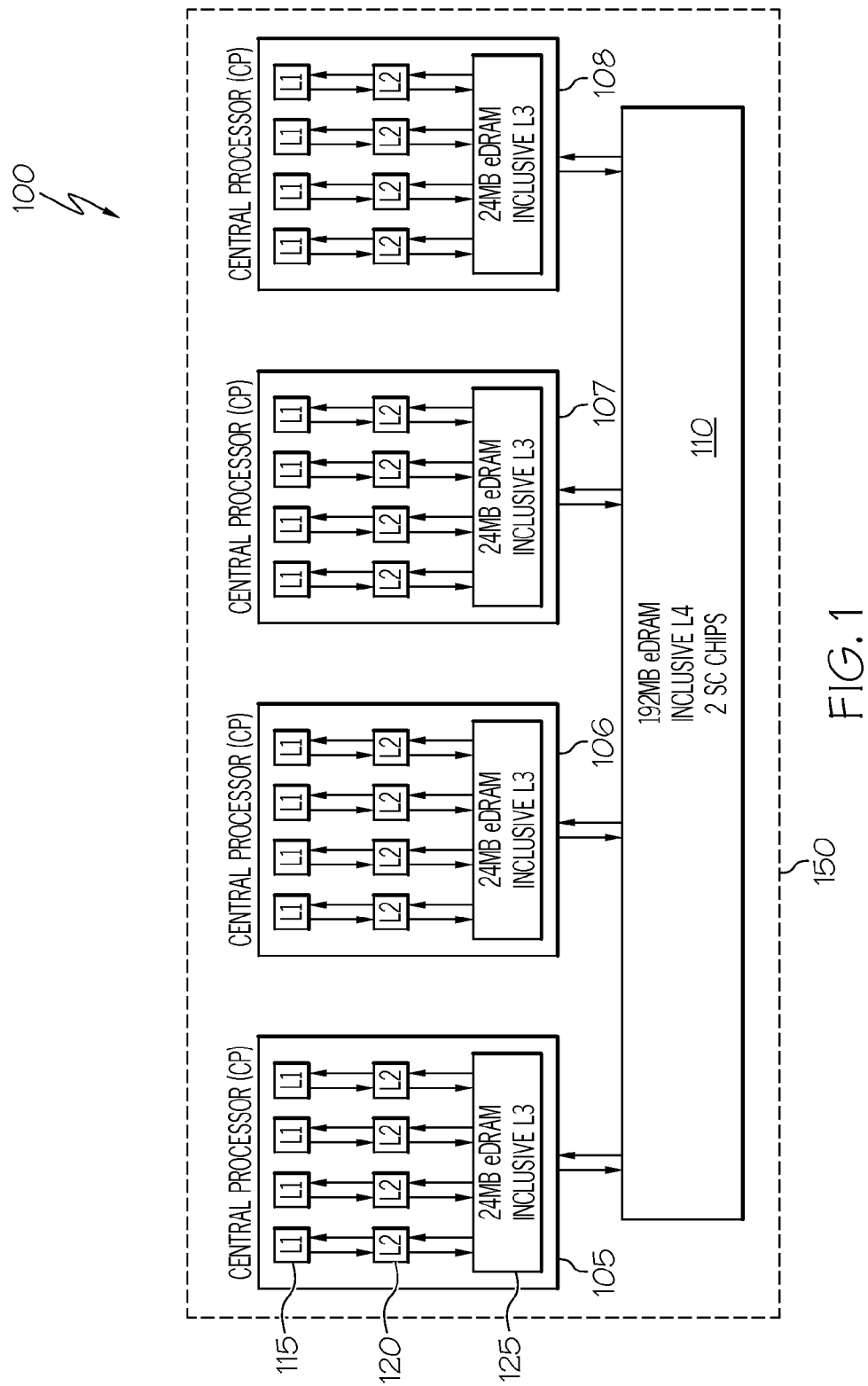
FIG. 1 is a block diagram depicting a multiprocessor system in accordance with an exemplary embodiment.
Figure 2:
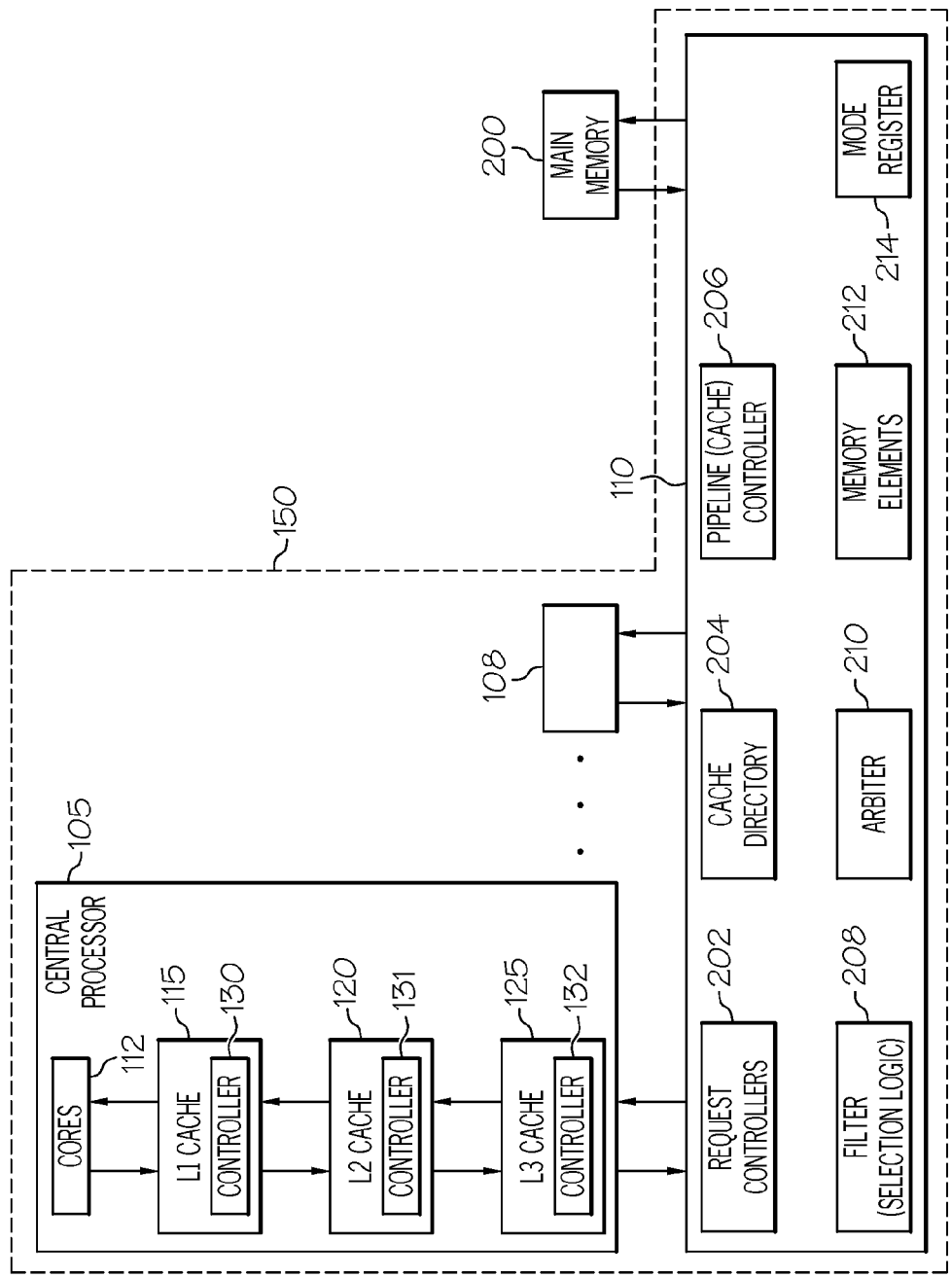
FIG. 2 is a block diagram illustrating a processor of the multiprocessor system of FIG. 1.

FIGS. 1 and 2 illustrate a cache topology 100. Topology 100 includes a plurality of central processors (CP) (also referred to as central processing units) 105-108 operatively connected via busses to one or more L4 caches 110. Although not shown in FIG. 1, each of the central processors (CP) 105-108 includes one or more cores 112, such as shown in connection with CP 105 in FIG. 2, which read and execute instructions passed to topology 100. Each core 112 of each central processor (CP) 105 is operatively connected via busses to corresponding L1 caches 115, L2 caches 120, and L3 caches 125. L1 caches 115 are physically closest to the cores 112, next are L2 caches 120, and then L3 caches 125. Although L3 caches 125 and L4 caches 110 may comprise embedded dynamic random access memory (DRAM), which is referred to as eDRAM, it is understood by a skilled artisan that any other types of suitable memory such as SRAM may be utilized. A plurality of central processors 105 operatively connected to L4 caches 110 (e.g., two L4 caches) form a node 150. In a computing system, multiple such nodes 150 may be operatively connected to one another for communicating such as making and responding to requests, as understood by one skilled in the art.

Each individual central processor 105-108 is fabricated on a separate chip that includes the L1 caches 115, L2 caches 120, and L3 caches 125. L4 cache 110 is fabricated on another chip. As understood by a skilled artisan, fabrication of chips including integrated circuits, wires, metal layers, semiconductor (and/or other material) components, etc., may be formed via lithography and other techniques. The fabrication process may include various deposition techniques including physical vapor deposition (PVD), chemical vapor deposition (CVD), electrochemical deposition (ECD), molecular beam epitaxy (MBE), and atomic layer deposition (ALD) among others. As best shown in FIG. 2 central processors 105-108 are operatively connected to a single L4 cache 110. However, it should be understood that exemplary embodiment may include one or more processors connected to one or more L4 caches and multiple memory chips.

In accordance with exemplary embodiments, processors 105-108 exchange data with memory 200 through L4 cache 110. Data exchange takes the form of requests for access to memory 200. The requests may pass from requestors such as L1 caches 115, L2 caches 120, L3 caches 125, cores 112, and other nodes 150 to a resource on L4 cache 110. The requestors may be on the same and/or different central processors 105-108. Requestors may be on the same and/or different nodes 150. Also, the requestor may be any I/O controller (not shown), as understood by one skilled in the art. Each requestor is able to individually request access to a desired resource(s) necessary to process a task on L4 cache 110 through a request controller 202. Resources on the L4 cache 110 may include accessing the cache directory 204, a pipeline controller 206, a filter 208, an arbiter 210, memory elements 212, and a mode register 214. Resources may also include accessing a main memory 200 through L4 cache 110. Also note that although exemplary implementations depict examples with respect to the L4 cache 110, it is understood that exemplary embodiments are not meant to be limited to operations of the L4 cache 110. For example, the technique discussed herein applies equally to the L3 cache 125 receiving requests from, e.g., the L2 cache 120 and the L4 cache 110. In addition, L3 cache 125 may include the elements shown and described for the L4 cache 110. Also, exemplary embodiments may be implemented in, e.g., main memory 200, external memory (not shown), etc. Furthermore main memory 200 and external memory may include the elements shown and described for the L4 cache 110. Main memory 200 includes partitions that are allocated to each processor. As storage capacity in one partition becomes inadequate for a particular process, memory space is dynamically de-allocated from less active processes and dynamically allocated to the particular process to enhance processing speed and effectiveness as will be discussed more fully below. The allocation and de-allocation are tracked in a single configuration table such as shown at 250 in FIG. 3. Configuration table 250 includes a first or "A" register 254, a second or "B" register 256, and a physical address space 258 that contains storage increments associated with, for example, a partition in memory 200.

Figures 4, 5:
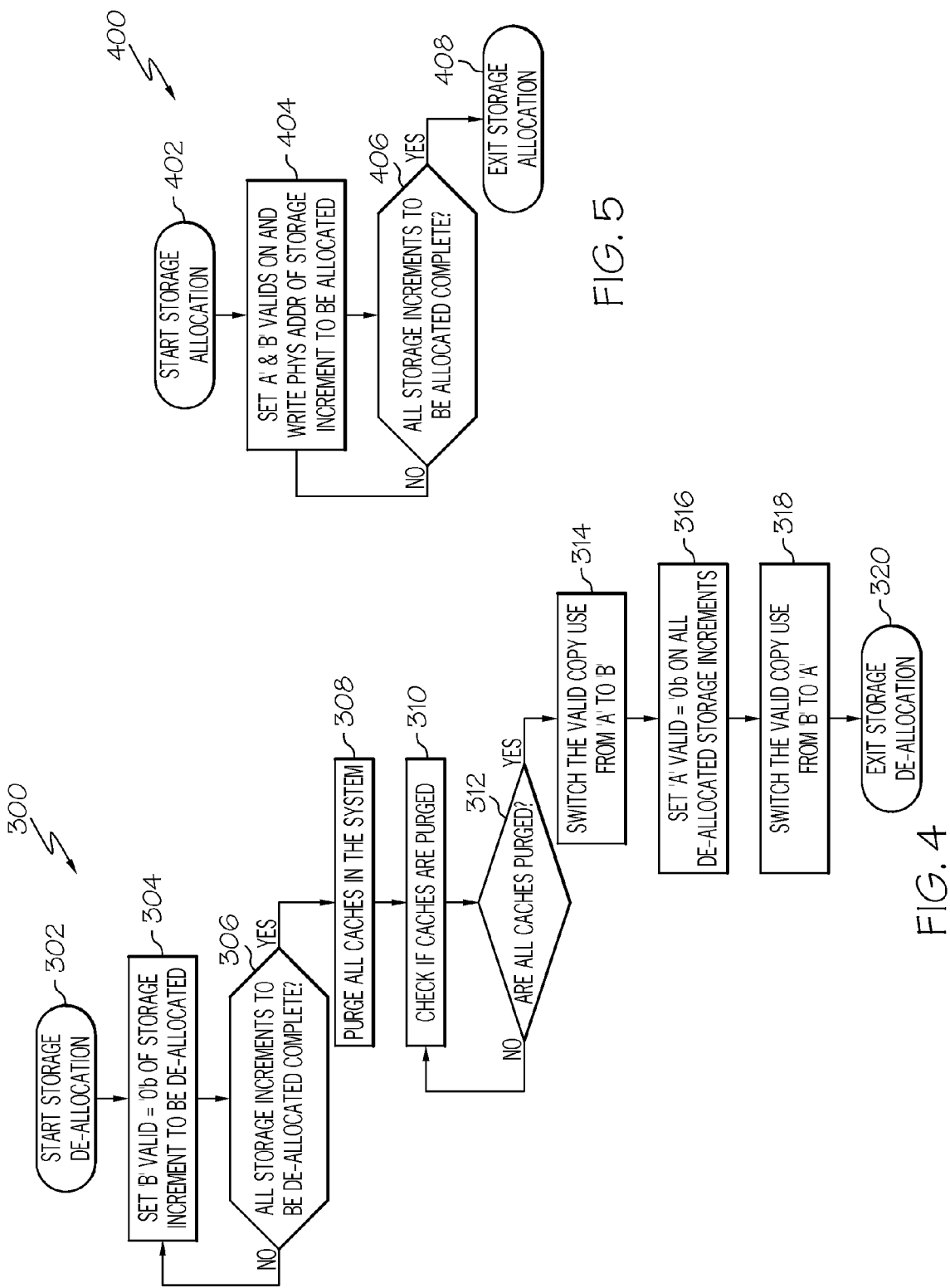
FIG. 4 is a flow chart illustrating a method of de-allocating storage allocation in accordance with an exemplary embodiment.
FIG. 5 is a flow chart depicting a method of storage allocation in accordance with an exemplary embodiment.

Reference will now be made to FIG. 4 in describing a method 300 of tracking dynamic memory de-allocation using only configuration table 250. A storage de-allocation is initiated as indicated in block 301. Prior to initiating de-allocation, first register 254 has a value M=1 and second register 256 has a value N=1. The M=1 and N=1 values designate the desired storage increments in first and second registers 254 and 256 as being valid. Also, prior to initiating the de-allocation, first register 254 is designated as an active register. The active register contains the valid copy of the desired storage increments. Once de-allocation has begun, second register 256 is set to a value of N=0 in block 304. The value N=0 designates that desired storage increments in second register 256 are invalid thereby de-allocating all desired storage increments associated with second register 256. At this point, a determination is made in block 306 whether all desired storage increments are de-allocated. Once all desired storage increments are de-allocated, all caches associated with configuration table 250 are purged as indicated in block 308 and check is made in block 310 to verify that all associated caches are purged.

In block 312, the purging of the associated caches is confirmed. Once the purging of the caches is confirmed, second register 256 is designated as the active register. That is second register 256 now contains the valid copy of the desired storage increments in block 314. At this point, first register 254 is set to a value M=0 in block 316. As indicated above, the value M=0 designates that the desired storage increments associated with first register 254 are invalid thereby de-allocating all desired storage increments associated with first register 254. Once all desired storage increments are de-allocated, first register 254 is re-designated as the active register in block 318 and storage de-allocation is complete as indicated in block 320.

Once de-allocation is complete in block 320, storage allocation establishing a larger (or smaller) storage area can begin. Reference will now be made to FIG. 5 in describing a method 400 of allocating storage in accordance with an exemplary embodiment. Block 402 signals the beginning of storage allocation. Once initiated, first register 254 and second register 256 is set to a value M=1 and N=1 respectively. Setting the values to 1 in first and second registers 254 and 256 designates that the desired storage increments stored in both registers 254 and 256 are valid and the physical address associated with each desired storage increment can be accessed. At this point, a determination is made in block 406 whether all desired storage increments are allocated. If all desired storage increments are allocated, allocation is ended in block 408. At this point it should be understood that the exemplary embodiments describe a method and device for performing dynamic storage de-allocation and allocation using a single configuration table. The use of a single configuration table frees up additional storage space that would otherwise be used to maintain multiple configuration table copies.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer program product 500 including a computer readable medium 505 having computer program code logic 508 that can direct a computer, other programmable data processing apparatus, or other devices to function in a particular manner, such that the instructions stored in the computer readable medium 505 produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A computer implemented method of tracking dynamic memory de-allocation using a single configuration table having a first register and a second register, the method comprising:
   setting the first register as an active register;
   initiating a de-allocation of desired storage increments from a memory partition;
   setting the desired storage increments in the second register as invalid;
   purging all caches associated with the single configuration table;
   setting the second register as the active register and the first register as an inactive register;
   setting the desired storage increments in the first register as invalid; and
   switching the active register from the second register to the first register to complete memory de-allocation using the single configuration table.

2. The method of claim 1, further comprising: verifying that all desired storage increments are de-allocated in the second register prior to purging all caches.

3. The method of claim 1, further comprising: verifying that all caches are purged prior to switching the active register.

4. The method of claim 1, further comprising: tracking allocation of memory in the single configuration table.

5. The method of claim 4, further comprising:
   setting the first and second registers as the valid register; and
   writing a physical address of the desired storage increment to the first and second registers.

6. The method of claim 5, further comprising: verifying that all desired storage increments are allocated in the first and second registers.

7. A device configured to track memory de-allocation in a single configuration table having first and second registers, the device comprising:
   memory for storing a program; and
   a processor functionally coupled to the memory, the processor being configured to be responsive to computer-executable instructions contained in the program and configured to implement a method comprising:
      setting the first register an active register;
      initiating a de-allocation of desired storage increments from a memory partition;
      setting the desired storage increments in the second register as invalid;
      purging all caches associated with the single configuration table;
      setting the second register as the active register and the first register as an inactive register;
      setting the desired storage increments in the first register as invalid; and
      switching the active register from the second register to the first register to complete memory de-allocation using the single configuration table.

8. The device of claim 7, wherein the method further comprises: verifying that all the desired storage increments are de-allocated prior to purging all caches.

9. The device of claim 7, wherein the method further comprises: verifying that all caches are purged prior to switching the active register.

10. The device of claim 7, wherein the method further comprises: tracking allocation of memory in the single configuration table.

11. The device of claim 10, wherein the method further comprises:
    setting the first and second registers as the valid register; and
    writing a physical address of the desired storage increment to the first and second registers.

12. The device of claim 11, wherein the method further comprises:
    verifying that all desired storage increments are allocated in the first and second registers.

13. A computer program product for tracking memory de-allocation in a single configuration table having first and second registers, comprising a non-transitory storage medium readable by a processing circuit and storing instructions for execution by the processing circuit for performing a method comprising:
    setting the first register as an active register;
    initiating a de-allocation of desired storage increments from a memory partition;
    setting the desired storage increments in the second register as invalid;
    purging all caches associated with the single configuration table;
    setting the second register as the active register and the first register as an inactive register;
    setting the desired storage increments in the first register as invalid; and
    switching the active register from the second register to the first register to complete memory de-allocation using the single configuration table.

14. The computer program product of claim 13, wherein the method further comprises: verifying that all desired storage increments are de-allocated prior to purging all caches.

15. The computer program product of claim 13, wherein the method further comprises: verifying that all caches are purged prior to switching the active register.

16. The computer program product of claim 13, wherein the method further comprises: tracking allocation of memory in the single configuration table.

17. The computer program product of claim 16 wherein the method further comprises:
    setting the first and second registers as the valid register; and
    writing a physical address of the desired storage increment to the first and second registers.

18. The computer program product of claim 17, wherein the method further comprises: verifying that all desired storage increments are allocated in the first and second registers.

* * * * *